(12) United States Patent
Ida et al.

(10) Patent No.: US 10,656,899 B2
(45) Date of Patent: May 19, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Kentaro Ida, Tokyo (JP); Takuya Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,366

(22) PCT Filed: Feb. 24, 2017

(86) PCT No.: PCT/JP2017/006992
§ 371 (c)(1),
(2) Date: Jul. 11, 2018

(87) PCT Pub. No.: WO2017/154610
PCT Pub. Date: Sep. 14, 2017

(65) Prior Publication Data
US 2019/0034155 A1    Jan. 31, 2019

(30) Foreign Application Priority Data
Mar. 10, 2016 (JP) .................................. 2016-047657

(51) Int. Cl.
*G06F 17/00* (2019.01)
*G06F 3/16* (2006.01)
(Continued)

(52) U.S. Cl.
CPC .................. *G06F 3/16* (2013.01); *G01H 7/00* (2013.01); *G10K 11/28* (2013.01); *G10K 11/352* (2013.01);
(Continued)

(58) Field of Classification Search
CPC ... G06F 3/16; G01H 7/00; H04N 5/66; H04N 5/74; H04R 1/34; H04R 1/026;
(Continued)

(56) References Cited

U.S. PATENT DOCUMENTS

2015/0378019 A1* 12/2015 Schissler ................. G06T 15/06
700/94
2016/0192105 A1* 6/2016 Breebaart ............... G10L 19/00
381/303
(Continued)

FOREIGN PATENT DOCUMENTS

| JP | 2006-019864 A | 1/2006 |
| JP | 2007-043585 A | 2/2007 |
| JP | 2010-056710 A | 3/2010 |

OTHER PUBLICATIONS

Google translation of APplicant disclosed JP 2007043585 (Year: 2005).*
Renkus-Heinz Ease Manual (Year: 2009).*

*Primary Examiner* — Paul C McCord
(74) *Attorney, Agent, or Firm* — Paratus Law Group, PLLC

(57) ABSTRACT

The present technology relates to an information processing apparatus, an information processing method, and a program that can improve satisfaction with a sound of a reflective speaker. An audio visual (AV) system includes an acoustic control unit that controls an output of an output sound from a reflective speaker on the basis of a reflection position of the output sound. The present technology can be applied to, for example, an AV system using a drive-type projector and a drive-type speaker. Further, the present technology can be applied to, for example, an AV system using a drive-type projector including a reflective speaker.

18 Claims, 11 Drawing Sheets

(51) Int. Cl.
*H04S 7/00* (2006.01)
*H04N 5/74* (2006.01)
*G10K 11/35* (2006.01)
*H04R 1/34* (2006.01)
*G01H 7/00* (2006.01)
*G10K 11/28* (2006.01)
*H04N 5/66* (2006.01)
*H04R 3/00* (2006.01)
*H04R 1/02* (2006.01)

(52) U.S. Cl.
CPC ................. *H04N 5/66* (2013.01); *H04N 5/74* (2013.01); *H04R 1/34* (2013.01); *H04S 7/303* (2013.01); *H04R 1/026* (2013.01); *H04R 3/00* (2013.01); *H04R 2217/03* (2013.01); *H04S 2400/13* (2013.01)

(58) Field of Classification Search
CPC ....... H04R 3/00; H04R 2217/03; H04S 7/303; H04S 2400/13
USPC .......................................................... 700/94
See application file for complete search history.

(56) References Cited

U.S. PATENT DOCUMENTS

| | | | |
|---|---|---|---|
| 2017/0026750 A1* | 1/2017 | Mansfield | H04R 5/02 |
| 2017/0150264 A1* | 5/2017 | Nelson | A47C 7/72 |
| 2017/0208392 A1* | 7/2017 | Smithers | H04R 1/26 |
| 2017/0374484 A1* | 12/2017 | Lando | G10L 19/008 |
| 2018/0068644 A1* | 3/2018 | Clark | H04R 1/30 |
| 2018/0192186 A1* | 7/2018 | Tsingos | G10L 19/008 |

\* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/006992 (filed on Feb. 24, 2017) under 35 U.S.C. § 371, which claims priority to Japanese Patent Application No. 2016-047657 (filed on Mar. 10, 2016), which are all hereby incorporated by reference in their entirety.

TECHNICAL FIELD

The present technology relates to an information processing apparatus, an information processing method, and a program, and more particularly to an information processing apparatus, an information processing method, and a program favorably used when output control of a reflective speaker is performed.

BACKGROUND ART

Conventionally, there is known a reflective speaker that generates a virtual sound source at a reflection position by causing an output sound from a speaker to hit against and be reflected at a wall or the like, to make a user feel as if the sound is output from the virtual sound source (see, for example, Patent Document 1).

As the reflective speaker, a super directional speaker having sharp directivity such as an ultrasonic speaker (parametric speaker) is used, for example.

CITATION LIST

Patent Document

Patent Document 1: Japanese Patent Application Laid-Open No. 2010-56710

SUMMARY OF THE INVENTION

Problems to be Solved by the Invention

However, while the reflective speaker can freely set the position (reflection position) of the virtual sound source, the volume becomes too small because of the distance to the virtual sound source or the material of the reflection position, or a feeling of discomfort may occur because the position of the virtual sound source is too far from the display position of the image, for example.

Therefore, the present technology improves the satisfaction level with the sound of the reflective speaker.

Solutions to Problems

An information processing apparatus of one aspect of the present technology includes an acoustic control unit configured to control an output of an output sound from a reflective speaker on the basis of a reflection position of the output sound.

The information processing apparatus can cause the acoustic control unit to control the output of the output sound on the basis of at least one of a distance from the reflective speaker to the reflection position and a distance from the reflection position to a user.

The information processing apparatus can cause the acoustic control unit to control the output of the output sound on the basis of a reflection characteristic of the reflection position.

The information processing apparatus can cause the reflective speaker to output the output sound of an ultrasonic wave and to make an outputting direction of the output sound variable, and can further include a map generation unit configured to scan the output sound in a space where the reflective speaker reflects the output sound, and generate a space map including the reflection characteristic in the space on the basis of a detection result of a reflected sound.

The information processing apparatus can cause the map generation unit to generate the space map including a three-dimensional shape of the space on the basis of the detection result of the reflected sound.

The information processing apparatus can cause the reflective speaker to make an outputting direction of the output sound variable, and can cause the acoustic control unit to control the reflection position according to the outputting direction of the output sound from the reflective speaker.

The information processing apparatus can cause the acoustic control unit to control the reflection position on the basis of a display position of an image to which the output sound corresponds.

The information processing apparatus can cause the acoustic control unit to control the reflection position on the basis of a reflection characteristic in a space where the reflective speaker reflects the output sound.

The information processing apparatus can cause the acoustic control unit to control the reflection position on the basis of at least one of a pointing position that is a position specified by a user, and a direction of gaze of the user.

The information processing apparatus can cause, when an image to be displayed in the pointing position exists, the acoustic control unit to cause the reflective speaker to output the output sound corresponding to the image toward the reflection position.

An image control unit configured to control display of an image on the basis of the pointing position is further provided, and the information processing apparatus can cause, when an image to be displayed in the pointing position exists, the image control unit to display the image in the pointing position.

The information processing apparatus can cause, when an image to be displayed in the direction of gaze of the user exists, the acoustic control unit to cause the reflective speaker to output the output sound corresponding to the image toward the reflection position. An image control unit configured to control display of an image on the basis of the direction of gaze of the user is further provided, and the information processing apparatus can cause, when an image to be displayed in the direction of gaze of the user exists, the image control unit to display the image in the direction of gaze of the user.

The information processing apparatus can cause the acoustic control unit to control the reflection position on the basis of content of an image to which the output sound corresponds.

The information processing apparatus can cause the acoustic control unit to control the reflection position on the basis of a motion of a moving body in the image.

The information processing apparatus can cause the acoustic control unit to control a characteristic of the output sound.

The reflective speaker can be further provided.

A projector having a variable projecting direction of an image is further provided, and the information processing apparatus can cause the reflective speaker to make an outputting direction of the output sound variable.

An information processing method of one aspect of the present technology includes an acoustic control step of controlling an output of an output sound from a reflective speaker on the basis of a reflection position of the output sound.

A program of one aspect of the present technology causes a computer to execute processing including an acoustic control step of controlling an output of an output sound from a reflective speaker on the basis of a reflection position of the output sound.

In one aspect of the present technology, an output of an output sound from a reflective speaker is controlled on the basis of a reflection position of the output sound.

Effects of the Invention

According to one aspect of the present technology, satisfaction with a sound of a reflective speaker is improved.

Note that the effects described here are not necessarily limited, and any of effects described in the present disclosure may be exhibited.

MODE FOR CARRYING OUT THE INVENTION

Hereinafter, a mode for carrying out the invention (hereinafter referred to as "embodiment") will be described in detail with reference to the drawings. Note that the description will be given in the following order.

1. Embodiment
2. Modification

1. Embodiment

Configuration Example of AV System 10

Figure 1:
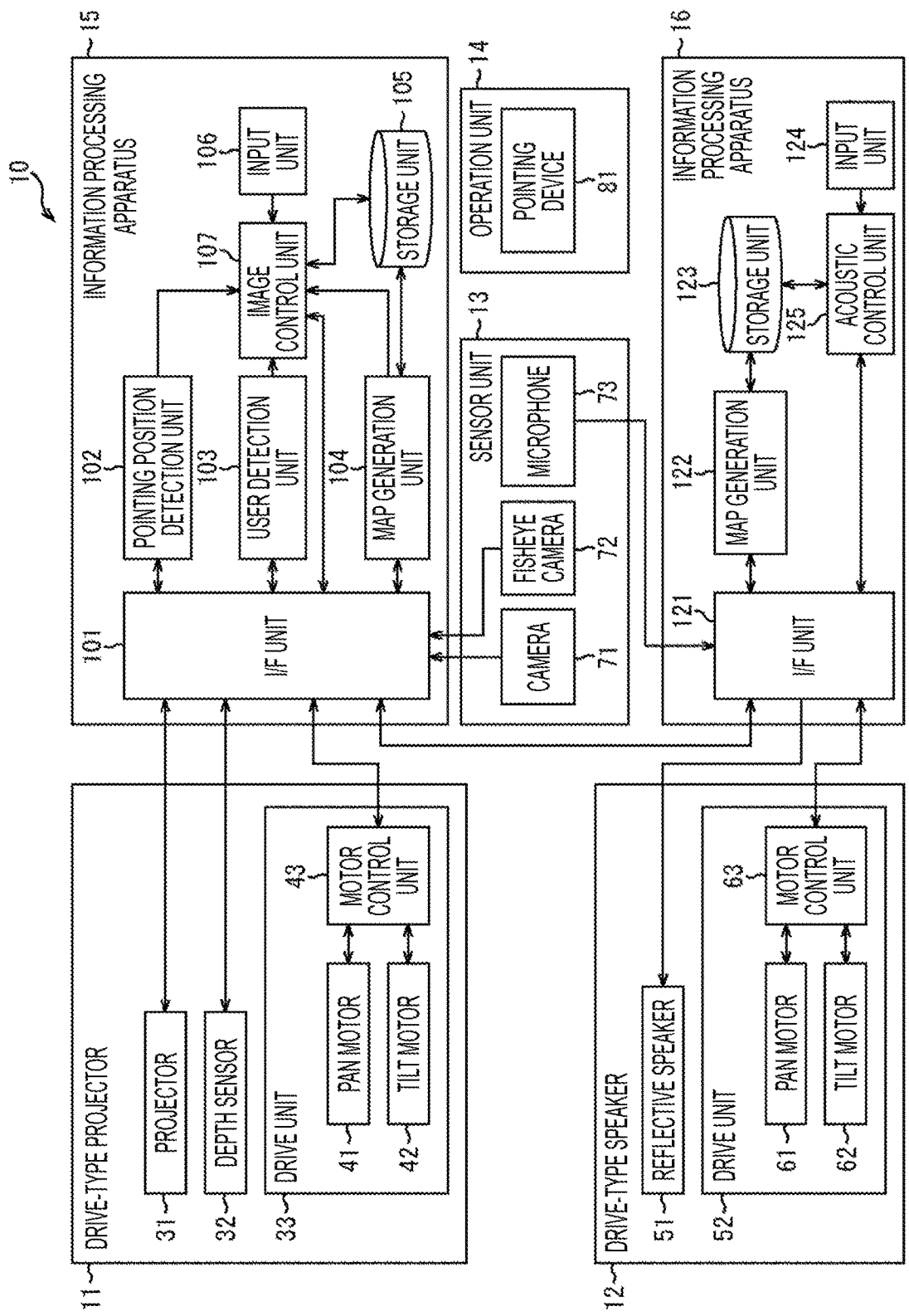
FIG. 1 is a block diagram illustrating a first embodiment of an AV system to which the present technology is applied.
Figure 2:
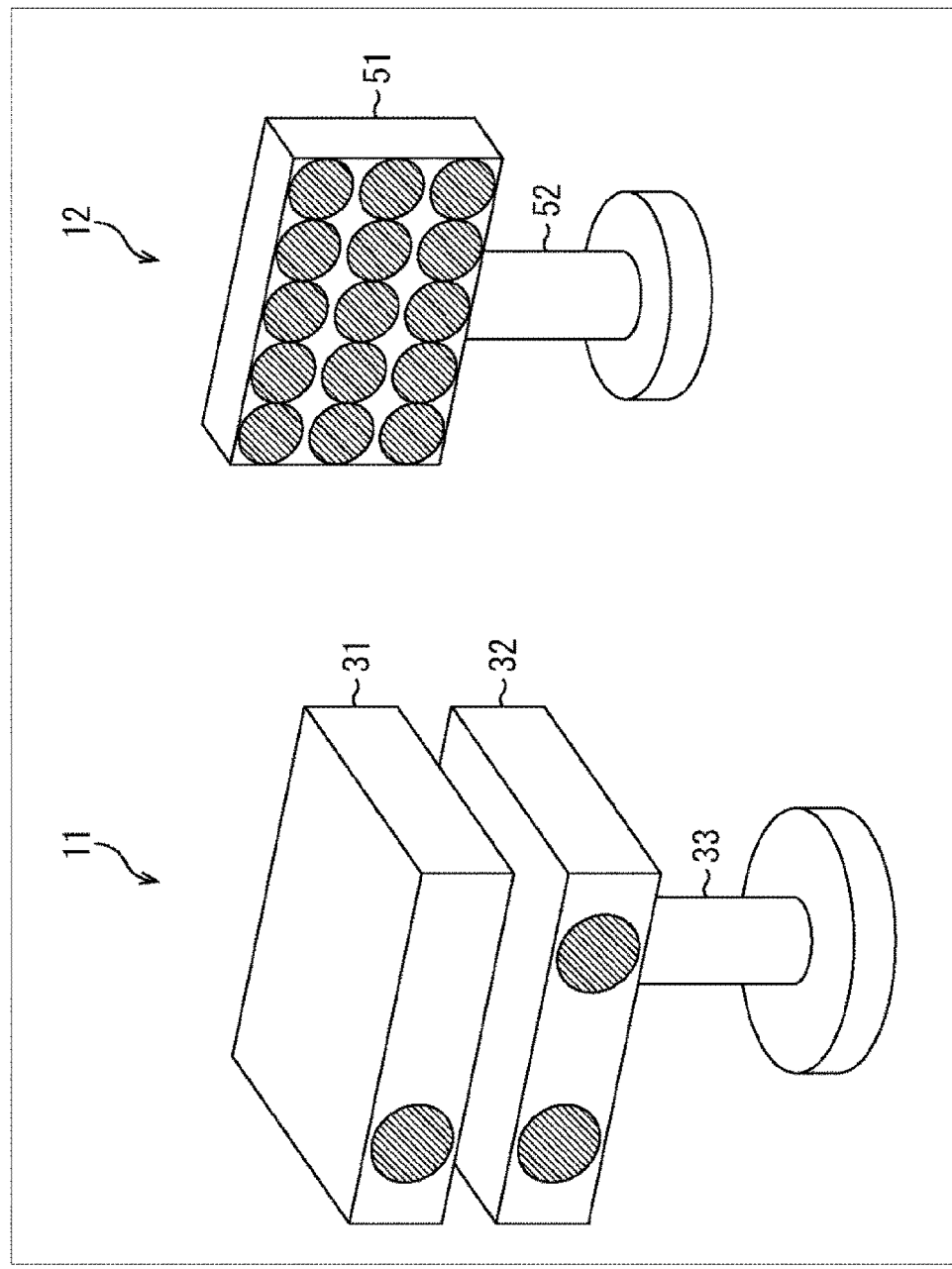
FIG. 2 is a schematic view illustrating a configuration example of appearance of a drive-type projector and a drive-type speaker of the AV system of FIG. 1.

First, a configuration example of an audio visual (AV) system 10 to which the present technology is applied will be described with reference to FIGS. 1 and 2. FIG. 1 is a block diagram illustrating a functional configuration example of the AV system 10. FIG. 2 is a schematic view illustrating a configuration example of appearance of a drive-type projector 11 and a drive-type speaker 12 of the AV system 10.

The AV system 10 is a system that projects an image in a predetermined space (hereinafter referred to as a display space) and outputs a sound accompanying the image. Further, the AV system 10 can freely change a display position of the image in the display space and a position of a virtual sound source, and is used for projection mapping and the like, for example.

The AV system 10 includes the drive-type projector 11, the drive-type speaker 12, a sensor unit 13, an operation unit 14, an information processing apparatus 15, and an information processing apparatus 16.

The drive-type projector 11 is a projector in which a projecting direction of an image is variable. The drive-type projector 11 includes a projector 31, a depth sensor 32, and a drive unit 33. As illustrated in FIG. 2, in the drive-type projector 11, the depth sensor 32 is installed on the drive unit 33, and the projector 31 is installed on the depth sensor 32.

The projector 31 projects an image based on image data supplied from the information processing apparatus 15 onto a wall or the like in the display space under the control of the information processing apparatus 15. Note that the method of the projector 31 is not limited to a specific method, and any method can be adopted.

The depth sensor 32 captures a distance image indicating a distance of each position in the display space from the depth sensor 32, using infrared light, for example, and supplies the captured distance image to the information processing apparatus 15 under the control of the information processing apparatus 15. Note that, as the method of the depth sensor 32, any method such as a time of flight (TOF) method, a pattern irradiation method, or a stereo camera method can be adopted.

The drive unit 33 controls a projecting direction of the projector 31 and a capturing direction of the depth sensor 32 under the control of the information processing apparatus 15. The drive unit 33 includes a pan motor 41, a tilt motor 42, and a motor control unit 43.

The pan motor 41 is a motor that rotates the projector 31 and the depth sensor 32 in a pan direction (horizontal direction).

The tilt motor 42 is a motor that rotates the projector 31 and the depth sensor 32 in a tilt direction (vertical direction).

The motor control unit 43 controls rotation of the pan motor 41 and the tilt motor 42 under the control of the information processing apparatus 15.

Note that the drive unit 33 may also be configured to be rotatable in a yaw direction (around a main axis in the projecting direction of an image), for example. Further, the drive unit 33 may further include a moving mechanism such as a motor and a wheel.

The drive-type speaker 12 is a unit that outputs a sound in accordance with an image to be projected in the display space by the drive-type projector 11. As illustrated in FIG. 2, in the drive-type speaker 12, a reflective speaker 51 is installed on a drive unit 52.

The reflective speaker 51 is a speaker that generates a virtual sound source at a reflection position by outputting and reflecting an output sound at a desired position in the display space under control of the information processing apparatus 16. A user feels that a sound is being output from the position of the virtual sound source. The system of the reflective speaker 51 is not particularly limited as long as the reflective speaker 51 is a speaker capable of generating the virtual sound source at the reflection position. For example, the reflective speaker 51 is configured by a super directional speaker having sharp directivity.

Note that, as will be described below, in the case of creating a space map of the display space on the basis of a reflected sound with respect to the output sound of the reflective speaker 51, it is desirable to output an ultrasonic output sound from the reflective speaker 51. For example, the reflective speaker 51 is desirably configured by an ultrasonic speaker (parametric speaker) that outputs a signal obtained by modulating a carrier wave including ultrasonic waves by a predetermined method.

Note that, hereinafter, in some cases, the reflective speaker 51 outputting the output sound toward the virtual sound source and reflecting the output sound at the virtual sound source is expressed as outputting a sound from the virtual sound source.

The drive unit 52 controls the outputting direction of the reflective speaker 51 under the control of the information processing apparatus 15. The drive unit 52 includes a pan motor 61, a tilt motor 62, and a motor control unit 63.

The pan motor 61 is a motor that rotates the reflective speaker 51 in the pan direction (horizontal direction).

The tilt motor 62 is a motor that rotates the reflective speaker 51 in the tilt direction (vertical direction).

The motor control unit 63 controls rotation of the pan motor 61 and the tilt motor 62 under the control of the information processing apparatus 15.

Note that the drive unit 52 may also be configured to be rotatable in the yaw direction (around a main axis in the outputting direction of an output sound), for example. Further, the drive unit 52 may further include a moving mechanism such as a motor and a wheel.

The sensor unit 13 includes a camera 71, a fisheye camera 72, and a microphone 73.

The camera 71 captures an inside of the display space and supplies an image obtained as a result of capturing (hereinafter the image is referred to as a display space image) to the information processing apparatus 15. The display space image is used, for example, for detection of a position, a gaze direction, a gesture, and the like of the user in the display space.

The fisheye camera 72 is configured by a camera including a fisheye lens, and captures a super wide-angle image. The fisheye camera 72 supplies an image obtained as a result of capturing (hereinafter the image is referred to as a fisheye image) to the information processing apparatus 15. The fisheye image is used, for example, for detection of an irradiation position (pointing position) of infrared light emitted from a pointing device 81.

The microphone 73 is used, for example, for detection of the reflected sound with respect to the output sound from the reflective speaker 51. The microphone 73 supplies an audio signal indicating the detected sound to the information processing apparatus 16.

The operation unit 14 includes the pointing device 81.

The pointing device 81 is an operation device for the user to point to a desired position. For example, the pointing device 81 irradiates a position with infrared light to point to the position (pointing position) according to a user's operation with the infrared light.

Note that the pointing device 81 may be configured by a dedicated device or by a general-purpose device usable for other uses such as a smartphone and a remote controller.

The information processing apparatus 15 is configured by, for example, a computer, or a processor such as a CPU, a memory, and the like. The information processing apparatus 15 is mainly used for control of the drive-type projector 11.

The information processing apparatus 15 includes an interface (I/F) unit 101, a pointing position detection unit 102, a user detection unit 103, a map generation unit 104, a storage unit 105, an input unit 106, and an image control unit 107.

The I/F unit 101 is configured by, for example, a communication device, a connector, and the like. The I/F unit 101 transmits and receives data and the like to and from the information processing apparatus 16, the projector 31, the depth sensor 32, the motor control unit 43, the camera 71, and the fisheye camera 72. Further, the I/F unit 101 supplies the received data and the like to each unit of the information processing apparatus 15, and acquires data or the like to be transmitted, from each unit of the information processing apparatus 15.

Note that, as a communication method of the I/F unit 101, any wired or wireless method can be adopted. Further, the communication method of the I/F unit 101 may be changed for each target with which communication is performed. Further, for example, the I/F unit 101 may directly perform communication with each communication target or may perform communication via a network or the like.

The pointing position detection unit 102 detects the pointing position by the pointing device 81 on the basis of the fisheye image captured by the fisheye camera 72. The pointing position detection unit 102 supplies a detection result to the image control unit 107 and supplies the detection result to the information processing apparatus 15 via the I/F unit 101.

Note that any method can be adopted as the detection method of the pointing position detection unit 102.

The user detection unit 103 detects, for example, the position, the gaze direction, the gesture, and the like of the user in the display space on the basis of the display space image captured by the camera 71. The user detection unit 103 supplies a detection result to the image control unit 107 and supplies the detection result to the information processing apparatus 16 via the I/F unit 101.

Note that any method can be adopted as the detection method of the user detection unit 103.

The map generation unit 104 controls the depth sensor 32 and the motor control unit 43 via the I/F unit 101 to control capturing of the distance image in the display space by the depth sensor 32. Then, the map generation unit 104 performs space recognition of the inside of the display space using the distance image, and generates a first space map indicating a three-dimensional shape of an object, a wall, and the like in the display space. The first space map includes, for example, a three-dimensional point group map and includes depth information indicating the distance of each position in the display space from the drive-type projector 11 (depth sensor 32).

Further, the map generation unit 104 acquires a second space map from the information processing apparatus 16 via the I/F unit 101, and generates an integrated space map obtained by integrating the first space map and the second space map. The integrated space map includes, for example, the depth information indicating the distance of each position in the display space from the drive-type projector 11 (depth sensor 32), reflection characteristic information indicating reflection characteristics (for example, reflectance, a reflection angle, and the like) of each position, and display characteristic information indicating availability of display of an image (availability of projection of the image) at each position in the display space. The map generation unit 104 causes the storage unit 105 to store the generated integrated space map, and supplies the generated integrated space map to the information processing apparatus 16 via the I/F unit 101.

Further, the map generation unit 104 detects positions of the drive-type speaker 12, the microphone 73, and the like in the display space on the basis of the first space map, for example. The map generation unit 104 supplies a detection result to the image control unit 107 and to the information processing apparatus 16 via the I/F unit 101.

Note that, for example, positions of the drive-type speaker 12, the microphone 73, and the like may be detected on the basis of the display space image captured by the camera 71.

The input unit 106 is configured by, for example, an operation device and the like, and is used for input of commands, data (for example, image data), and the like to the image control unit 107.

The image control unit 107 controls display of an image by the drive-type projector 11. For example, the image control unit 107 controls the projector 31 via the I/F unit 101 to control content and display timing of the image to be displayed, and the like. Further, for example, the image control unit 107 controls the display position of the image by controlling the motor control unit 43 via the I/F unit 101 and controlling the projecting direction of the image of the projector 31. Further, the image control unit 107 supplies information indicating the display position of the image to the information processing apparatus 16 via the I/F unit 101.

The information processing apparatus 16 is configured by, for example, a computer, or a processor such as a CPU, a memory, and the like. The information processing apparatus 16 is mainly used for control of the drive-type speaker 12.

The information processing apparatus 16 includes an interface (I/F) unit 121, a map generation unit 122, a storage unit 123, an input unit 124, and an acoustic control unit 125.

The I/F unit 121 is configured by, for example, a communication device, a connector, and the like. The I/F unit 121 transmits and receives data and the like to and from the information processing apparatus 15, the reflective speaker 51, the motor control unit 63, and the microphone 73. Further, the I/F unit 121 supplies the received data and the like to each unit of the information processing apparatus 16, and acquires data or the like to be transmitted, from each unit of the information processing apparatus 16.

Note that, as a communication method of the I/F unit 121, any wired or wireless method can be adopted. Further, the communication method of the I/F unit 121 may be changed for each target with which communication is performed. Further, for example, the I/F unit 121 may directly perform communication with each communication target or may perform communication via a network or the like.

Further, the map generation unit 122 controls the reflective speaker 51 and the motor control unit 63 via the I/F unit 121 to control scanning of the output sound from the reflective speaker 51 in the display space. Then, the map generation unit 122 performs space recognition of the inside of the display space on the basis of a detection result of the reflected sound detected by the microphone 73 when scanning the output sound in the display space, and generates a second space map indicating a three-dimensional shape of an object, a wall, and the like in the display space. The second space map includes, for example, a three-dimensional point group map, and includes depth information indicating the distance of each position in the display space from the drive-type speaker 12 (reflective speaker 51), and reflection characteristic information indicating reflection characteristics of each position. The map generation unit 104 supplies the generated second space map to the information processing apparatus 15 via the I/F unit 121.

Further, the map generation unit 122 acquires the integrated space map from the information processing apparatus 15 via the I/F unit 121, and causes the storage unit 123 to store the integrated space map.

The input unit 124 is configured by, for example, an operation device and the like, and is used for input of commands, data (for example, audio data), and the like to the acoustic control unit 125.

The acoustic control unit 125 controls an output of an output sound of the drive-type speaker 12. For example, the acoustic control unit 125 controls the reflective speaker 51 via the I/F unit 121 to control content, a volume, output timing, and the like of the output sound. Further, for example, the acoustic control unit 125 controls the reflection position (that is, the position of the virtual sound source) of the output sound by controlling the motor control unit 63 via the I/F unit 121 to control the outputting direction of the reflective speaker 51.

Note that, hereinafter, description of the I/F unit 101 of the information processing apparatus 15 and the I/F unit 121 of the information processing apparatus 16 are appropriately omitted for easy understanding of description. For example, when the map generation unit 104 supplies the integrated space map to the information processing apparatus 16 via the I/F unit 101, it is simply described that the map generation unit 104 supplies the integrated space map to the information processing apparatus 16.

{Processing of AV System 10}

Next, processing of the AV system 10 will be described with reference to FIGS. 3 to 9.

(Space Map Generation Processing)

Figure 3:
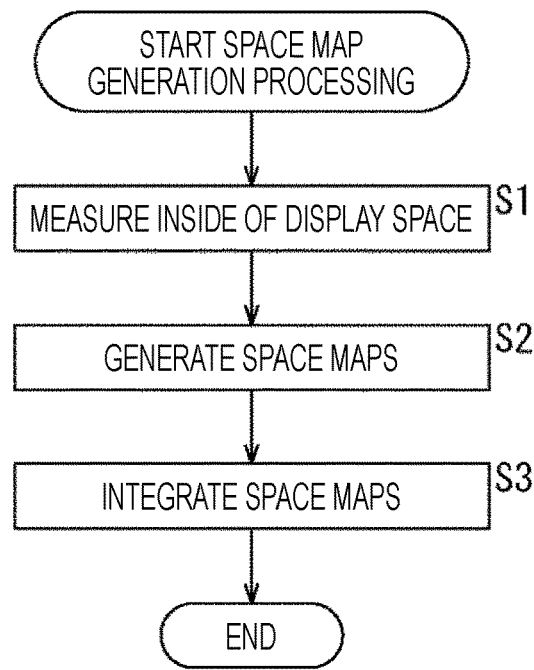
FIG. 3 is a flowchart for describing space map generation processing executed by the AV system of FIG. 1.

First, space map generation processing executed by the AV system 10 will be described with reference to the flowchart in FIG. 3. Note that this processing is started, for example, when the drive-type projector 11 and the drive-type speaker 12 are installed or when the installation position of at least one of the drive-type projector 11 and the drive-type speaker 12 is moved.

Figure 4:
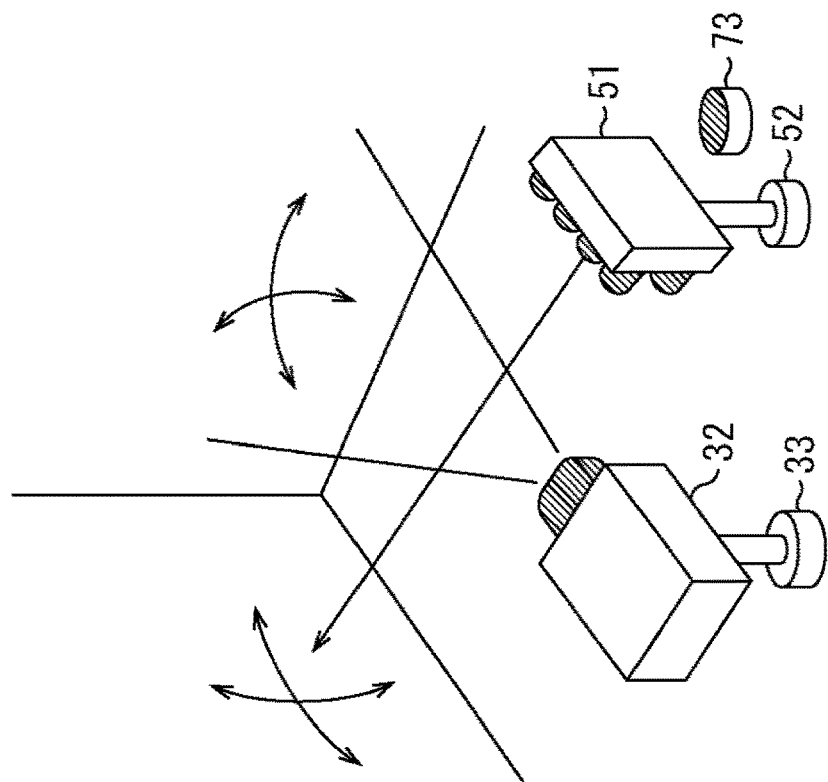
FIG. 4 is a view for describing a method of generating a space map.

In step S1, the AV system 10 measures the inside of the display space. To be specific, as illustrated in FIG. 4, the map generation unit 104 controls the motor control unit 43 to rotate the drive unit 33 in the pan direction and the tilt direction, and causes the depth sensor 32 to scan all of areas in the display space. With the scanning, all the areas in the display space are captured by the depth sensor 32, and the distance image indicating the distance of each area from the depth sensor 32 is obtained. The depth sensor 32 supplies the captured distance image to the map generation unit 104.

Further, as illustrated in FIG. 4, the map generation unit 122 controls the motor control unit 63 to rotate the drive unit 52 in the pan direction and the tilt direction, and scans the output sound (ultrasonic signal) output from the reflective speaker 51 in all of areas in the display space. With the scanning, the reflected sounds with respect to the output sounds from all the areas in the display space are detected by the microphone 73. The microphone 73 supplies the audio signals indicating detection results to the map generation unit 122.

Note that, in FIG. 4, illustration of the projector 31 is omitted for easy understanding of the drawing.

In step S2, the map generation unit 104 and the map generation unit 122 generate the space map. To be specific, the map generation unit 104 generates the first space map on the basis of the distance image captured by the depth sensor 32. The first space map includes the depth information indicating the distance of each position in the display space from the depth sensor 32.

Note that, since the depth sensor 32 uses reflection of infrared light, depth information of an area where reflection of infrared light cannot be used, such as a black wall, concrete, glass, or the like, is lacked in the first space map.

Further, the map generation unit 104 detects the positions of the drive-type speaker 12, the microphone 73, and the like in the display space on the basis of the first space map. The map generation unit 104 supplies detection result to the map generation unit 122 of the information processing apparatus 16.

The map generation unit 122 generates the second space map on the basis of the audio signal from the microphone 73. To be specific, the map generation unit 122 calculates the distances from the reflective speaker 51 and the microphone 73 to each position in the display space on the basis of the outputting direction of the output sound, the positions of the reflective speaker 51 and the microphone 73, and a time from when the output sound is output to when the reflected sound is received.

Figure 5:
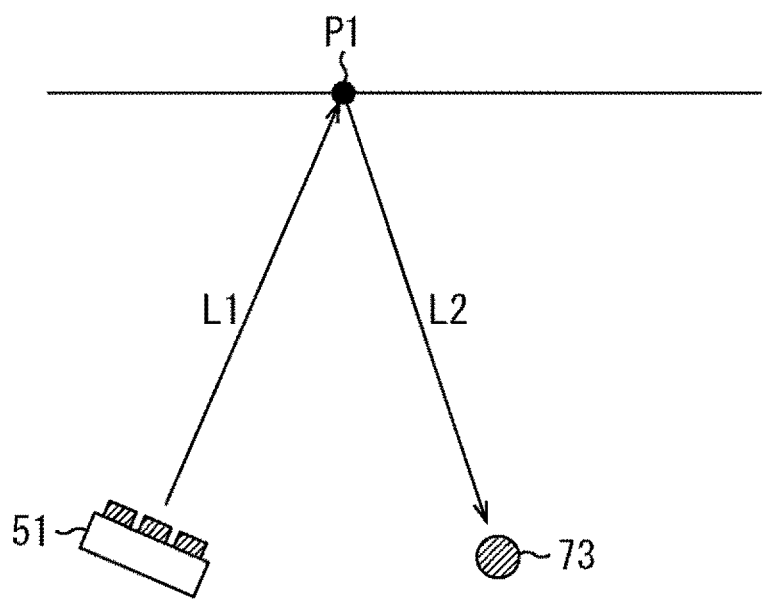
FIG. 5 is a view for describing a method of calculating reflectance.

Further, the map generation unit 122 calculates the reflectance of each position in the display space on the basis of the volume of the reflected sound. For example, a case in which the output sound output from the reflective speaker 51 is reflected at a reflection position P1, and the reflected sound of the output sound is detected by the microphone 73, as illustrated in FIG. 5, will be described. Note that, hereinafter, the distance between the reflective speaker 51 and the reflection position P1 is L1, and the distance between the reflection position P1 and the microphone 73 is L2.

Here, in the case of assuming that all the output sound is reflected in the direction of the microphone 73 without being attenuated (in the case of assuming that the reflectance is 100%) at the reflection position P1, an attenuation amount of the reflected sound detected by the microphone 73 with respect to the output sound can be estimated by the distance L1+the distance L2. Hereinafter, the attenuation amount of this case is referred to as a reference attenuation amount.

Meanwhile, in reality, the output sound is diffused or absorbed at the reflection position P1, and thus the volume of the reflected sound reflected in the direction of the microphone 73 is small. Therefore, the map generation unit 122 estimates the reflectance of the reflection position P1 according to a ratio of the attenuation amount of the reflected sound actually detected by the microphone 73 with respect to the output sound, and the reference attenuation amount.

Then, the map generation unit 122 generates the second space map including the depth information indicating the distance of each position in the display space from the reflective speaker 51, and the reflection characteristic information indicating the reflectance of each position in the display space.

Note that, even if an area lacks the depth information in the first space map because reflection of infrared light cannot be used, the depth information of the area can be obtained as long as reflection of the output sound (ultrasonic signal) can be used in the area.

The map generation unit 122 supplies the generated second space map to the map generation unit 104 of the information processing apparatus 15.

In step S3, the map generation unit 104 integrates the space maps. To be specific, the map generation unit 104 supplements the depth information of the area where the depth information is lacked in the first space map with the depth information of the second space map. Note that, since the depth information of the second space map is based on the position of the reflective speaker 51, the map generation unit 104 converts the depth information into depth information based on the position of the depth sensor 32.

Further, the map generation unit 104 generates display characteristic information indicating whether an image is displayable at each position in the display space. For example, the map generation unit 104 determines that a position where the depth information is obtained in the first space map is a position where an image is displayable. Meanwhile, the map generation unit 104 estimates hardness and surface material of the position where the depth information is lacked in the first space map on the basis of the reflection characteristic information of the second space map. Then, the map generation unit 104 determines whether an image is displayable at the position where the depth information is lacked in the first space map on the basis of the estimated hardness and surface material.

Note that the map generation unit 104 may determine all the positions where the depth information is lacked in the first space map as positions where display of an image is difficult. Further, for example, the map generation unit 122 of the information processing apparatus 16 may generate the display characteristic information.

Further, the map generation unit 104 uses the reflection characteristic information of each position in the display space, of the second space map, as reflection characteristic information of the integrated space map, as it is.

In this way, the map generation unit 104 generates the integrated space map including the depth information, the display characteristic information, and the reflection characteristic information of each position in the display space.

The map generation unit 104 causes the storage unit 105 to store the generated integrated space map. Further, the map generation unit 104 supplies the integrated space map to the map generation unit 122 of the information processing apparatus 16.

The map generation unit 122 converts the depth information of the integrated space map into information based on the position of the reflective speaker 51 according to the information based on the position of the depth sensor 32. The map generation unit 122 causes the storage unit 123 to store the integrated space map after conversion.

After that, the space map generation processing is terminated.

(Display Acoustic Control Processing)

Figure 6:
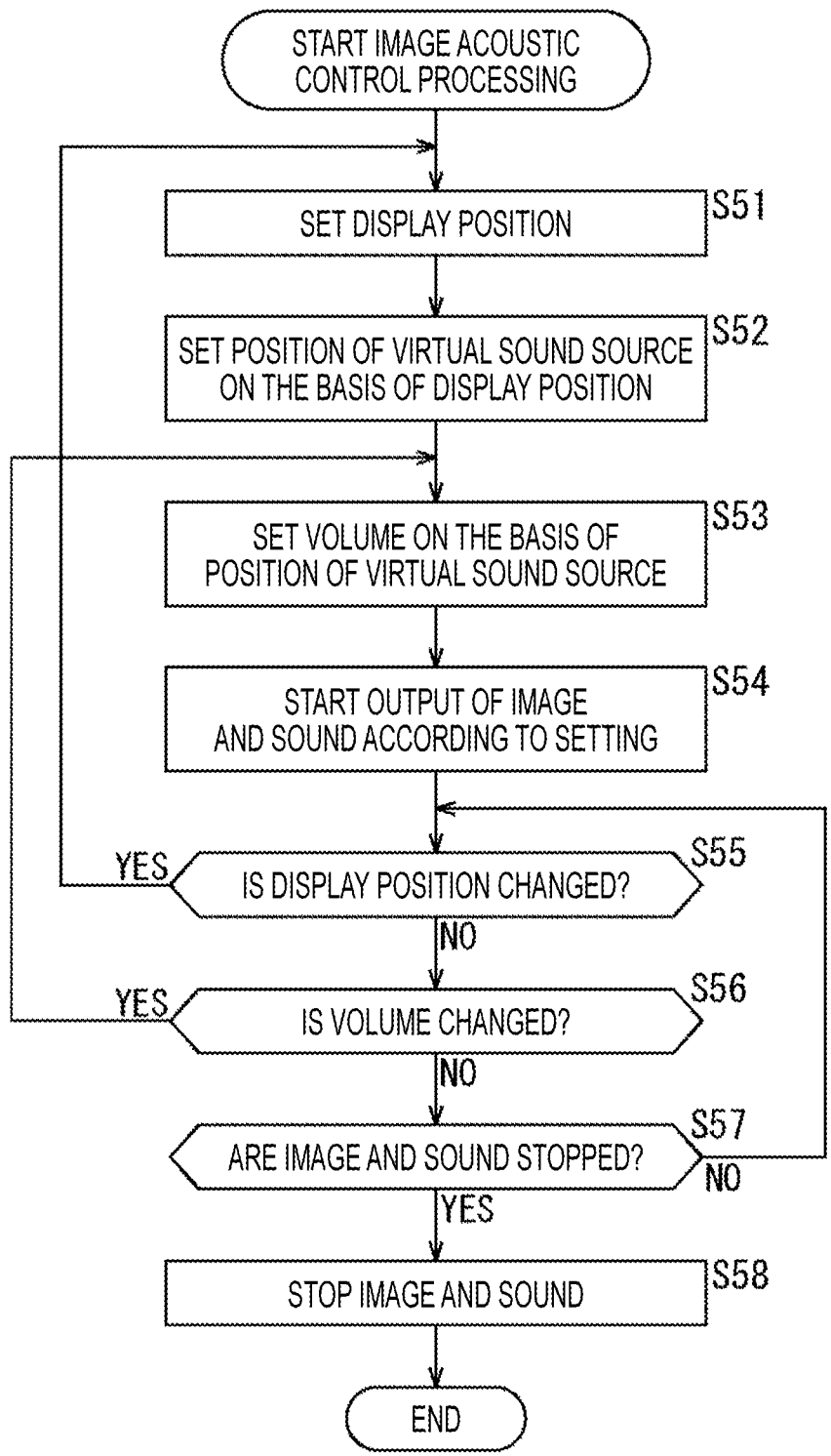
FIG. 6 is a flowchart for describing image acoustic control processing executed by the AV system of FIG. 1.

Next, image acoustic control processing executed by the AV system 10 will be described with reference to the flowchart in FIG. 6.

In step S51, the information processing apparatus 15 sets the display position. Here, an example of a method of setting the display position will be described.

Figure 7:
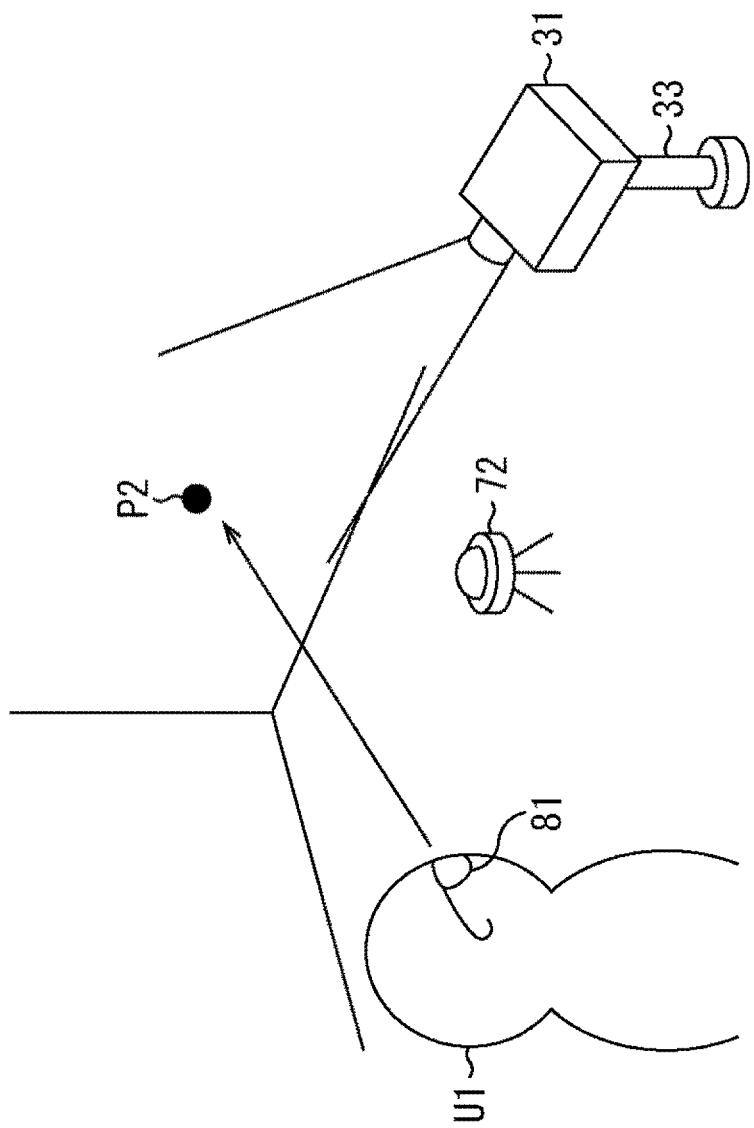
FIG. 7 is a view for describing an example of setting a display position by a pointing device.

First, an example of the case of setting the display position using the spectacle-type pointing device 81 will be described with reference to FIG. 7. Note that, in FIG. 7, illustration of the depth sensor 32 is omitted for easy understanding of the drawing.

For example, if a user U1 who wears the pointing device 81 turns his/her face toward a direction in which the user U1 wishes to display an image, infrared light is emitted from the pointing device 81 in the direction to which the user U1 turns his/her face. Then, the pointing position detection unit 102 detects a pointing position P2 specified with the pointing device 81 on the basis of the fisheye image captured by the fisheye camera 72. The pointing position detection unit 102 supplies a detection result of the pointing position P2 to the image control unit 107.

The image control unit 107 sets the display position with reference to the pointing position P2. For example, the image control unit 107 calculates the size of a projection area on which the image is to be projected on the basis of the distance from the projector 31 to the pointing position P2. Then, the image control unit 107 sets the position of the projection area such that the center of the projection area coincides with the pointing position P2.

Next, the image control unit 107 confirms whether an area in which display of the image is difficult is included in the set projection area on the basis of the display characteristic information of the integrated space map. Then, when the area in which display of the image is difficult is included in the projection area, the image control unit 107 corrects the position of the projection area not to include the area. At this time, for example, the position of the projection area is corrected such that a moving amount of the projection area is minimized.

Figure 8:
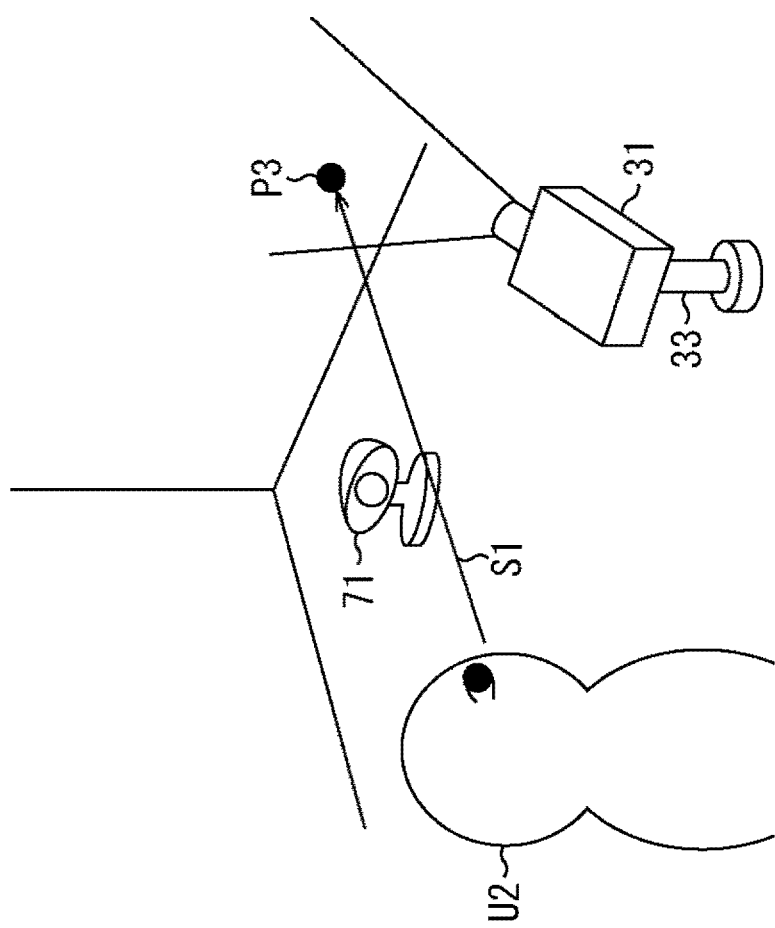
FIG. 8 is a view for describing an example of setting a display position by a gaze direction of a user.

Next, an example of the case of setting the display position on the basis of a direction of gaze of a user will be described with reference to FIG. 8. Note that, in FIG. 8, illustration of the depth sensor 32 is omitted for easy understanding of the drawing.

For example, the user detection unit 103 detects a gaze direction S1 of a user U2 on the basis of the display space image captured by the camera 71. The user detection unit 103 supplies a detection result of the gaze direction S1 to the image control unit 107. The image control unit 107 detects an intersection point P3 of the gaze direction S1 and a plane in the display space on the basis of the depth information of the integrated space map. Then, the image control unit 107 sets the position of the projection area with reference to the intersection point P3 by a similar method as in the case of using the pointing position P2 as a reference.

Note that the method of setting the display position is not limited to the example. For example, the image control unit 107 can detect a position (for example, a pointed position) specified by the user with a gesture as the pointing position and set the display position with reference to the detected pointing position.

The image control unit 107 supplies information indicating the set display position (the position of the projection area) to the acoustic control unit 125 of the information processing apparatus 16.

In step S52, the acoustic control unit 125 sets the position of the virtual sound source on the basis of the display position. For example, the acoustic control unit 125 sets a center of the projection area set by the image control unit 107 to the position of the virtual sound source.

Next, the acoustic control unit 125 determines whether the set position of the virtual sound source is appropriate on the basis of the reflection characteristic information of the integrated space map. For example, when the reflectance of the position of the virtual sound source is a predetermined threshold or more, the acoustic control unit 125 determines that the position of the virtual sound source is appropriate. On the other hand, when the reflectance of the position of the virtual sound source is less than the predetermined threshold, the acoustic control unit 125 determines that the position of the virtual sound source is inappropriate.

Then, when the acoustic control unit 125 determines that the position of the virtual sound source is inappropriate, the acoustic control unit 125 corrects the position of the virtual sound source. For example, the acoustic control unit 125 corrects the position of the virtual sound source to a position closest from the current position of the virtual sound source, of positions where the reflectance is the predetermined threshold or more in the projection area. Note that the acoustic control unit 125 corrects the position of the virtual sound source to the position closest from the current position of the virtual sound source, of positions where the reflectance is the predetermined threshold or more outside the projection area, when no position where the reflectance is the predetermined threshold or more exists in the projection area, for example.

Figure 9:
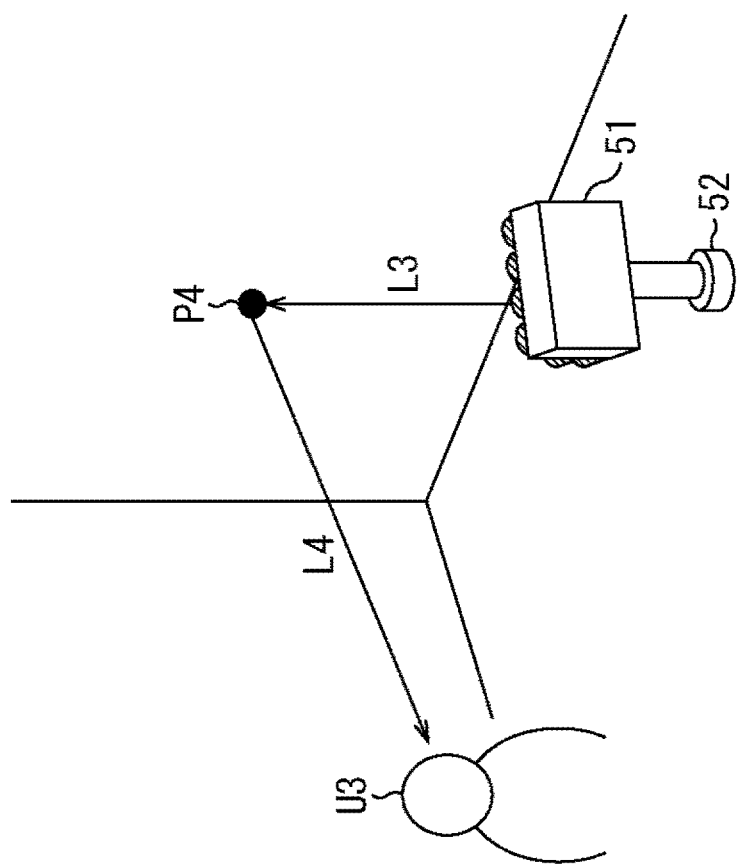
FIG. 9 is a view for describing volume control of the reflective speaker.

In step S53, the acoustic control unit 125 sets the volume on the basis of the position of the virtual sound source. For example, as illustrated in FIG. 9, a case in which the virtual sound source is set to a position P4 will be described.

The acoustic control unit 125 acquires a detection result of the position of a user U3 from the user detection unit 103 of the information processing apparatus 15. Further, the acoustic control unit 125 obtains a distance L3 between the reflective speaker 51 and the virtual sound source P4, a distance L4 between the virtual sound source P4 and the user U3, and the reflectance of the virtual sound source P4, on the basis of the integrated space map. The acoustic control unit 125 calculates the volume of the output sound in which the volume of the reflected sound from the virtual sound source P4 becomes a predetermined level at the position of the user U3, on the basis of the distances L3 and L4 and the reflectance of the virtual sound source P4. The acoustic control unit 125 sets the calculated volume to the volume of the output sound.

Note that the volume may be calculated using only one of the distance L3 and the distance L4, for example.

Further, the level of the volume at the position of the user U3 may be set to become constant regardless of the distance to the virtual sound source P4 or may be changed according to the distance to the virtual sound source P4, for example.

In the latter case, the level of the volume at the position of the user U3 may be set to be smaller as the total of the distances L3 and L4 becomes longer, and the volume at the position of the user U3 may be set to be larger as the total of the distances L3 and L4 becomes shorter, for example. Alternatively, the level of the volume at the position of the user U3 may be set to be smaller as the distance L3 becomes longer, and the volume at the position of the user U3 may be set to be larger as the distance L3 becomes shorter, for example. Alternatively, the level of the volume at the position of the user U3 may be set to be smaller as the distance L4 becomes longer, and the volume at the position of the user U3 may be set to be larger as the distance L4 becomes shorter, for example.

In step S54, the AV system 10 starts output of an image and a sound according to the setting. To be specific, the image control unit 107 controls the motor control unit 43 to adjust the direction of the projector 31 such that the image from the projector 31 is projected in the set projection area. The acoustic control unit 125 controls the motor control unit 63 to adjust the direction of the reflective speaker 51 such that the output sound from the reflective speaker 51 hits against the set position of the virtual sound source.

Then, the image control unit 107 and the acoustic control unit 125 start projection of the image from the projector 31 and output of the output sound from the reflective speaker 51 in synchronization with each other. At this time, the image control unit 107 performs geometric correction and the like so that the projected image is not distorted, for example. Further, the acoustic control unit 125 sets the volume of the output sound to the volume set in the processing of step S53.

In step S55, the image control unit 107 determines whether changing the display position. When the display position is determined not to be changed, the processing proceeds to step S56.

In step S56, the acoustic control unit 125 determines whether changing the volume. When the volume is determined not to be changed, the processing proceeds to step S57.

In step S57, the image control unit 107 determines whether stopping the image and the sound. When the image and the sound are determined not to be stopped, the processing returns to step S55.

After that, the processing of steps S55 to S57 is repeatedly executed until change of the display position is determined in step S55, change of the volume is determined in step S56, or stop of the image and the sound is determined in step S57.

On the other hand, in step S55, for example, when the image control unit 107 detects a trigger to change the display position, the image control unit 107 determines change of the display position, and the processing returns to step S51. Here, the trigger to change the display position is, for example, movement of the drive-type projector 11, movement of the pointing position specified with the pointing device 81 or a gesture, movement of the gaze of the user, or the like. After that, the processing of step S51 and the subsequent steps is executed. The display position is changed, and the position and the volume of the virtual sound source are changed with the change of the display position.

Further, in step S56, when the acoustic control unit 125 detects a trigger to change the volume, for example, the acoustic control unit 125 determines change of the volume, and the processing returns to step S53. Here, the trigger to change the volume is, for example, movement of the drive-type speaker 12, movement of the user, or the like. After that, the processing of step S53 and the subsequent steps is executed, and the volume is changed while the display position is unchanged.

Further, in step S57, the image control unit 107 determines stop of the image and the sound when a command to stop the image and the sound is input via the input unit 106, for example, and the processing proceeds to step S58.

In step S58, the AV system 10 stops the image and the sound. To be specific, the image control unit 107 instructs the acoustic control unit 125 to stop the output sound. Then, the image control unit 107 stops projection of the image from the projector 31. Further, the acoustic control unit 125 stops the output of the output sound from the reflective speaker 51.

After that, the image acoustic control processing is terminated.

As described above, the image and the virtual sound source can be automatically moved to the position desired by the user in accordance with the motion of the pointing position or the gaze. Further, the image is projected to avoid the position where the display is difficult, and therefore the image quality is favorably maintained.

Furthermore, since the position of the virtual sound source is set in accordance with the display position of the image, the user feels as if the sound is output from the image, and thus the sense of realism is increased and the satisfaction with the sound is improved.

Furthermore, since the volume of the output sound is appropriately adjusted on the basis of the position and the reflectance of the virtual sound source, and the position of the virtual sound source is corrected on the basis of the reflectance, occurrence of a feeling of discomfort to the sound can be prevented.

<2. Modification>

Hereinafter, modifications of the above-described embodiment of the present technology will be described.

{Modification regarding Control of Image and Virtual Sound Source}

In the above description, a case of moving the display position of the image and the position of the virtual sound source in accordance with the motion of the pointing position or the gaze of the user has been described. However, an image may be displayed or a sound may be output when a pointing position or gaze of a user satisfies a predetermined condition.

For example, a display position and display content of an image in a display space are determined in advance, and information thereof is registered in advance in an integrated space map. Then, for example, when the pointing position does not coincide with the display position set in the integrated space map, that is, when there is no image to be displayed at the pointing position, the image control unit 107 and the acoustic control unit 125 perform control not to display an image or output an output sound. On the other hand, for example, when the pointing position coincides with the display position set in the integrated space map, that is, when there is an image to be displayed at the pointing position, the image control unit 107 displays the image of the display content set to the display position. Further, the acoustic control unit 125 sets the position of a virtual sound source on the basis of the display position and outputs an output sound corresponding to the image to be displayed.

Alternatively, for example, when a gaze position of the user does not coincide with the display position set in the integrated space map, that is, when there is no image to be displayed in a gaze direction of the user, the image control unit 107 and the acoustic control unit 125 perform control not to display an image or output an output sound. On the other hand, for example, when the gaze position of the user coincides with the display position set in the integrated space map, that is, when there is an image to be displayed in the gaze direction of the user, the image control unit 107 displays the image of the display content set to the display position. Further, the acoustic control unit 125 sets the position of the virtual sound source on the basis of the display position and outputs the output sound corresponding to the image to be displayed.

This technology can be applied to a game, for example. For example, the position of an enemy is preset in the display space. The user moves the pointing position or the gaze to search for enemies in the display space. Then, when the pointing position or the gaze coincides with the position where the enemy exists, the image control unit 107 projects an image of the enemy at the position, and the acoustic control unit 125 sets the position of the virtual sound source on the basis of the position of the enemy to be displayed, and starts an output of a sound of the enemy. This improves the realism of the game.

Note that the display position of the image can be set not only to one place but also to a plurality of places. Further, the display position of the image is not necessarily fixed and may be moved with time. With the configuration, for example, in the example of the above-described game, the enemy can be moved, and output of the image and the sound of the enemy can be started by causing the pointing position or the gaze to coincide with the position of the moving enemy.

Further, in the example of the above-described game, for example, the pointing device 81 is set to a gun-type device. When a motion to shoot the gun is performed by pointing the pointing device 81, and when an enemy exists at the pointed position, an image that the enemy falls down can be displayed and a sound that the enemy falls down can be output.

Further, the acoustic control unit 125 may set the virtual sound source at the display position set in the display space, and notify the user of the display position by outputting a sound from the virtual sound source. Then, when the user moves the pointing position or the gaze in the direction in which the sound is output, that is, the direction of the virtual sound source, an image may be displayed at that position. With the configuration, for example, in the above-described example of the game, notification of the position of the enemy can be provided by sound without displaying an image. Further, the user can recognize a state in which the enemy approaches or goes away by moving the position of the virtual sound source in accordance with the motion of the enemy.

Further, the AV system 10 can notify the user of the display position of the image by moving the position of the virtual sound source. For example, when the user turns his/her gaze to a different direction from the image, the acoustic control unit 125 sets the position of the virtual sound source to the direction of the gaze of the user and outputs a sound from the virtual sound source. Then, the acoustic control unit 125 can attract the user's attention and notify the user of existence of the image by gradually moving the position of the virtual sound source toward the display position of the image.

Further, the position of the virtual sound source may be moved according to the content of the image. For example, when a moving body exists in the image, the acoustic control unit 125 can cause the user to feel as if the sound is output from the moving body by moving the position of the virtual sound source in accordance with the motion of the moving body. For example, the user can experience a character talking to the user by moving the virtual sound source in accordance with the character in the image.

Note that, when the moving body is moved from the inside to the outside of an angle of view, the position of the virtual sound source may be moved from the inside to the outside of the angle of view. In contrast, when the moving body is moved from the outside to the inside of the angle of view, the position of the virtual sound source may be moved from the outside to the inside of the angle of view. For example, when a car runs away, the sense of realism can be increased by moving the position of the virtual sound source from the inside to the outside of the angle of view in accordance with the motion of the car. Further, for example, a realistic experience that a ball hit by a baseball batter flies backward, grazing the user, can be realized.

Further, a plurality of virtual sound sources may be installed by providing a plurality of the drive-type speakers 12. With the configuration, different virtual sound sources can be installed to a plurality of moving bodies in an image, respectively, for example, and the positions of the virtual sound sources can be individually moved in accordance with motions of the moving bodies, thereby to enhance the sense of realism.

Further, a surround system can be realized by arranging virtual sound sources in a similar manner to arrangement of speakers in a surround system, for example. In this case, the installation position of the drive-type speaker 12 has a higher degree of freedom than the installation position of an ordinary speaker. Therefore, the surround system can be more easily realized.

Further, for example, the sense of realism can be further enhanced by dividing a projection area of one image into a plurality of areas, placing a virtual sound source in each divided area, and causing a corresponding virtual sound source to mainly share the sound output of the area. Note that the position of the virtual sound source may be inside or outside the area. For example, the sense of realism can be further enhanced by dividing the projection area into four areas of 2×2, arranging the virtual sound sources in four corners in the projection area or in positions outside the projection area but near the four corners of the projection area, and causing the virtual sound source near each area to mainly output the sound corresponding to the image in the area.

Further, the present technology can also be applied to the case where the projector 31 is not the drive-type projector, and the position and direction are manually changed. For example, when the position and direction of the projector 31 are manually changed, the acoustic control unit 125 controls the position of the virtual sound source on the basis of the display position or controls the volume of the output sound from the reflective speaker 51 on the basis of the position of the virtual sound source, by the above-described method.

Note that the position and direction of the projector 31 can be detected by providing an acceleration sensor, a gyro sensor, or the like to the projector 31, for example.

Further, the present technology can also be applied to the case where the position of the projector 31 is fixed and the display position of the image is fixed. That is, the acoustic control unit 125 can control the position of the virtual sound source or can control the volume of the output sound of the reflective speaker 51 by the above-described method on the basis of the display position of the fixed image or the content of the image.

Further, the present technology can be applied to the case of using a display device having a screen, instead of to the projection-type projector 31. For example, the acoustic control unit 125 can control the position of the virtual sound source or can control the volume of the output sound of the reflective speaker 51 by the above-described method on the basis of the position of the screen on which the image is displayed and the content of the image. Further, for example, the sense of realism can be further enhanced by dividing the screen into a plurality of areas, placing virtual sound sources inside or outside the screen in each area, and causing a corresponding virtual sound source to mainly share the sound output of the area.

Further, the present technology can also be applied to the case where the reflective speaker 51 is not of a drive-type, and the position and direction are manually changed. To be specific, when the reflective speaker 51 is not a drive-type speaker, the position of the virtual sound source can be uniquely determined by installing the reflective speaker 51. Then, for example, the acoustic control unit 125 can control the volume of the output sound from the reflective speaker 51 by the above-described method, on the basis of the distance to the set virtual sound source, and the reflectance of the position of the virtual sound source.

Furthermore, the acoustic control unit 125 may set the position of the virtual sound source, using a reflection characteristic other than the reflectance. For example, the acoustic control unit 125 recognizes the shape of the display space on the basis of the depth information of the integrated space map, and calculates an angle of the reflection position to the output sound, thereby to estimate a reflecting direction (reflection angle) of the reflected sound, which is a type of the reflection characteristics. Therefore, for example, the acoustic control unit 125 may set, to the virtual sound source, a position at which a large amount of the output sound is reflected to the direction of the user. With the setting, the user can reliably hear the sound. Further, for example, the acoustic control unit 125 can allow a user at a specific position to hear the sound by setting a position at which the output sound is specularly reflected, to the virtual sound source, on the basis of the surface material of the display space.

Modification Regarding Configuration Example of System

The configuration example of the AV system 10 in FIG. 1 is an example, and can be changed as necessary.

For example, the share of the functions of the information processing apparatus 15 and the information processing apparatus 16 can be changed. Further, for example, the information processing apparatus 15 and the information processing apparatus 16 can be put together.

Further, for example, a part or the whole of the function the information processing apparatus 15 can be provided in the drive-type projector 11, or a part or the whole of the functions of the information processing apparatus 15 and the information processing apparatus 16 can be provided in the drive-type projector 11. Further, for example, the drive-type projector 11 can be provided in the information processing apparatus 15 or the information processing apparatus 16.

Further, for example, a part or the whole of the function of the information processing apparatus 16 can be provided in the drive-type speaker 12, or a part or the whole of the functions of the information processing apparatus 15 and the information processing apparatus 16 can be provided in the drive-type speaker 12. Further, for example, the drive-type speaker 12 can be provided in the information processing apparatus 15 or the information processing apparatus 16.

Figure 10:
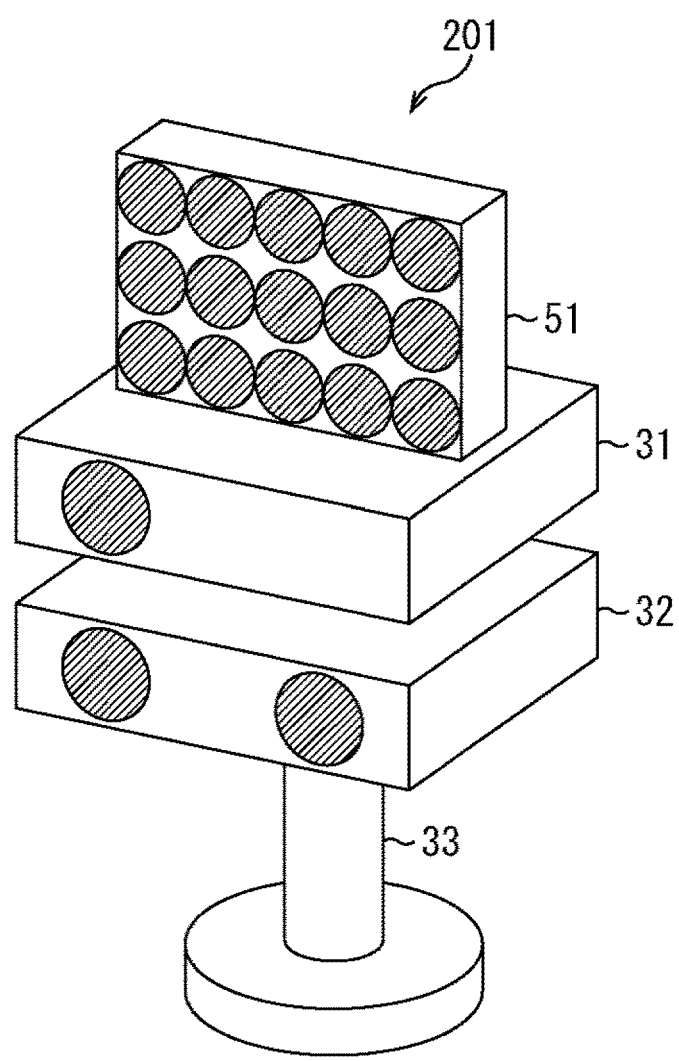
FIG. 10 is a block diagram illustrating a second embodiment of an AV system to which the present technology is applied.
Figure 11:
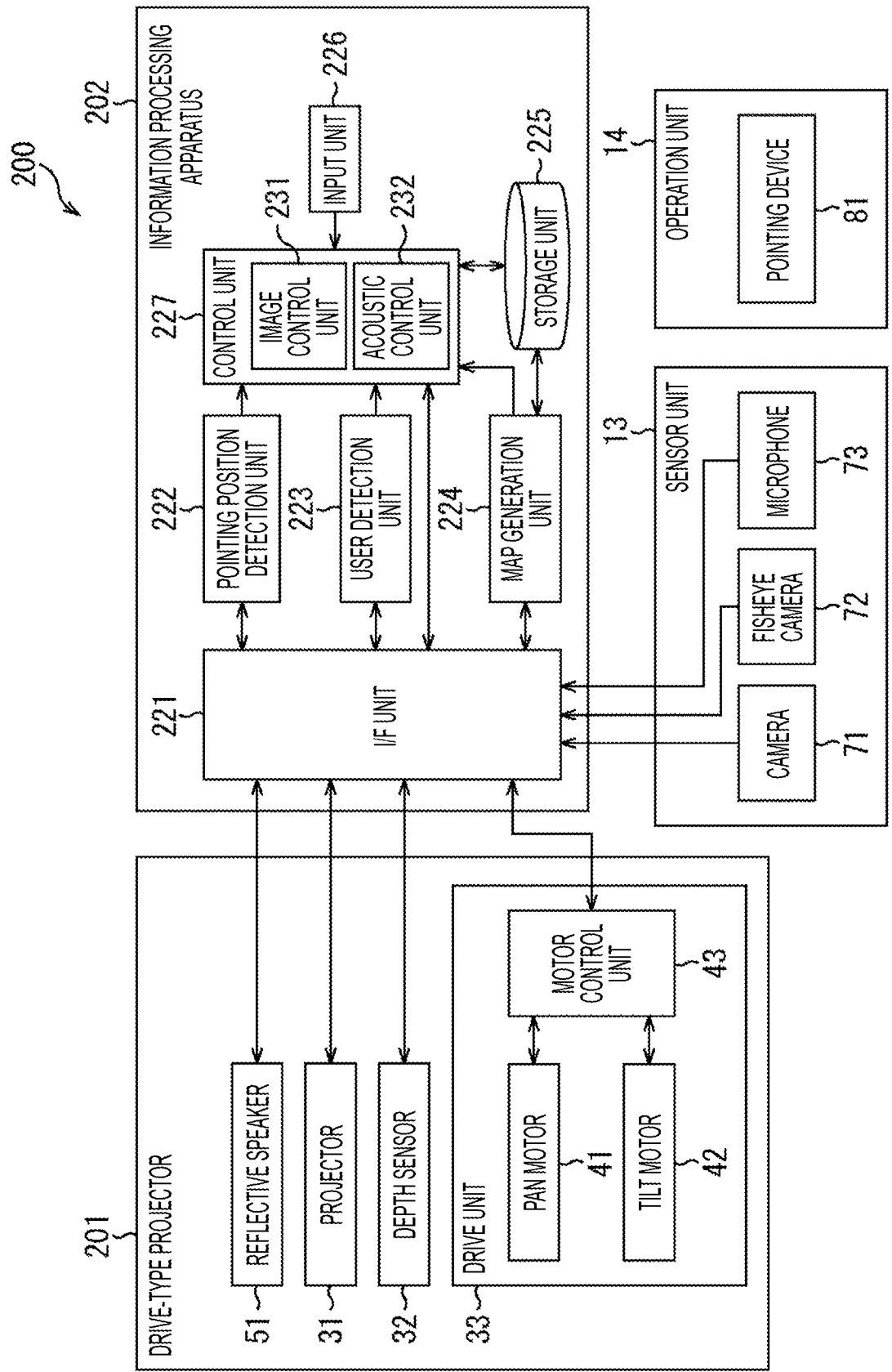
FIG. 11 is a schematic view illustrating a configuration example of appearance of a drive-type projector of the AV system of FIG. 10.

Further, for example, as illustrated in FIGS. 10 and 11, the projector 31 and the reflective speaker 51 may be integrated. FIG. 10 is a block diagram illustrating a functional configuration example of an AV system 200 in which the projector 31 and the reflective speaker 51 are integrated. FIG. 11 is a schematic view illustrating a configuration example of appearance of a drive-type projector 201 that constitutes the AV system 200.

Note that, in FIGS. 10 and 11, a portion corresponding to FIGS. 1 and 2 is denoted by the same reference numeral, and description thereof is appropriately omitted.

The AV system 200 is different from the AV system 10 in FIG. 1 in that a drive-type projector 11 is provided in place of the drive-type projector 11 and the drive-type speaker 12, and an information processing apparatus 202 is provided in place of the information processing apparatus 15 and the information processing apparatus 16.

As illustrated in FIG. 11, the drive-type projector 201 has a configuration in which a reflective speaker 51 is installed on a projector 31 of the drive-type projector 11 in FIG. 2. Therefore, the projector 31 and the reflective speaker 51 are rotated in a pan direction and a tilt direction by a drive unit 33, and are always directed in the same direction. Therefore, a display position of the projector 31 always coincides with a position of a virtual sound source of the reflective speaker 51.

The information processing apparatus 202 includes an interface (I/F) unit 221, a pointing position detection unit 222, a user detection unit 223, a map generation unit 224, a storage unit 225, an input unit 226, and a control unit 227.

The I/F unit 221 is configured by a communication device, a connector, and the like, similarly to the I/F unit 101 or the I/F unit 121 in FIG. 1, for example. The I/F unit 221 transmits and receives data and the like to and from a projector 31, a depth sensor 32, a motor control unit 43, the reflective speaker 51, a camera 71, a fisheye camera 72, and a microphone 73. Further, the I/F unit 221 supplies the received data and the like to each unit of the information processing apparatus 202, and acquires data or the like to be transmitted, from each unit of the information processing apparatus 202.

The pointing position detection unit 222 detects a pointing position by a pointing device 81 on the basis of a fisheye image captured by the fisheye camera 72, similarly to the pointing position detection unit 102 in FIG. 1. The pointing position detection unit 222 supplies a detection result to the control unit 227

The user detection unit 223 detects, for example, a position, a gaze direction, a gesture, and the like of a user in a display space on the basis of a display space image captured by the camera 71, similarly to the user detection unit 103 in FIG. 1. The user detection unit 103 supplies a detection result to the control unit 227.

The map generation unit 224 has both the functions of the map generation unit 104 and the map generation unit 122 in FIG. 1. For example, the map generation unit 224 controls the depth sensor 32 and the motor control unit 43 via the I/F unit 221 to control capturing of a distance image in the display space by the depth sensor 32. Then, the map generation unit 224 generates a first space map, using the distance image, similarly to the map generation unit 104 in FIG. 1.

Further, the map generation unit 224 controls the reflective speaker 51 and the motor control unit 43 via the I/F unit 221 to control scanning of an output sound from the reflective speaker 51 in the display space. Then, the map generation unit 224 generates a second space map on the basis of a detection result of a reflected sound detected by the microphone 73 when the output sound is scanned in the display space, similarly to the map generation unit 122 in FIG. 1.

Further, the map generation unit 224 generates an integrated space map obtained by integrating the first space map and the second space map, similarly to the map generation unit 104 in FIG. 1. The map generation unit 224 causes the storage unit 225 to store the generated integrated space map.

Further, the map generation unit 224 detects positions of the microphone 73 and the like in the display space on the basis of the first space map, for example, similarly to the map generation unit 104 in FIG. 1. The map generation unit 104 supplies a detection result to the control unit 227.

The input unit 226 is configured by, for example, an operation device and the like, and is used for input of commands, data (for example, image data and audio data), and the like to the control unit 227.

The control unit 227 has both the functions of the image control unit 107 and the acoustic control unit 125 in FIG. 1, and includes an image control unit 231 and an acoustic control unit 232.

The image control unit 231 controls display of an image by the drive-type projector 201 and the position of the virtual sound source by the reflective speaker 51. For example, the image control unit 231 controls the projector 31 via the I/F unit 221 to control content and display timing of the image to be displayed, and the like. Further, for example, the image control unit 231 controls the motor control unit 43 via the I/F unit 221 to control a projecting direction of the image of the projector 31 and an outputting direction of the reflective speaker 51, thereby to control the display position of the image and the reflection position of the output sound (that is, the position of the virtual sound source).

The acoustic control unit 232 controls the output of the output sound of the reflective speaker 51. For example, the acoustic control unit 232 controls the reflective speaker 51 via the I/F unit 121 to control content, a volume, output timing, and the like of the output sound.

In the AV system 200, since the direction of the projector 31 and the reflective speaker 51 can be coaxially controlled by controlling only the drive unit 33, the control processing is simplified. Further, the display position of the image and the position of the virtual sound source can easily coincide with each other. However, in the AV system 200, the flexibility of the position control of the virtual sound source is reduced as compared with the AV system 10. For example, setting the position of the virtual sound source to a position different from the display position of the image becomes difficult.

Further, in the above description, an example of moving the display position by changing the direction of the projector 31 has been described. However, for example, the display position may be moved by reflecting an image projected from the projector 31 at a reflector such as a mirror and changing the direction of the reflector. Similarly, in the above description, an example of moving the position of the virtual sound source by changing the direction of the reflective speaker 51 has been described. However, for example, the position of the virtual sound source may be moved by reflecting the output sound output from the reflective speaker 51 at a reflector such as a mirror and changing the direction of the reflector.

Further, for example, the depth information in the display space may be acquired using a sensor other than the depth sensor 32.

{Other Modifications}

Note that an experience to hear a sound from an object can be realized by projecting an image on not only a planar object such as a wall, a ceiling, a floor, a screen, or a curtain but also, for example, a stereoscopic object such as a book or a plastic bottle, and providing the virtual sound source on the surface of the object.

Furthermore, in the above description, an example of generating and using the integrated space map by integrating the first space map and the second space map has been described. However, only one of the first space map and the second space map can be generated and used. For example, in the case of using only the first space map, the sound volume control may just be performed on the basis of only the distance to the virtual sound source without performing sound volume control based on the reflectance of the position of the virtual sound source.

Further, for example, characteristics of the output sound other than the volume may be controlled, or the volume and another characteristic may be controlled by analyzing the reflection characteristics of each position in the display space in more detail. For example, the reflection characteristics for every frequency of each position are analyzed, and a frequency characteristic of the output sound may be controlled according to a reflection characteristic of a virtual position. For example, in the case of setting the virtual sound source to a position where the reflectance of a high-pitched sound is worse than that of a low-pitched sound, a high-frequency component of the output sound may be emphasized as compared with low-frequency component.

Further, for example, the output sound is time-divided so that a left sound and a right sound are alternately output, and the direction of the reflective speaker 51 is swung to the right and left in synchronization with the switching of the left and right sounds, whereby stereophonic reproduction can be realized by one reflective speaker 51.

Configuration Example of Computer

The above-described series of processing of the information processing apparatus 15, the information processing apparatus 16, and the information processing apparatus 202 can be executed by hardware or by software. In the case of executing the series of processing by software, a program that configures the software is installed in a computer. Here, the computer includes a computer incorporated in dedicated hardware, and a general-purpose personal computer and the like capable of executing various functions by installing various programs, for example.

Figure 12:
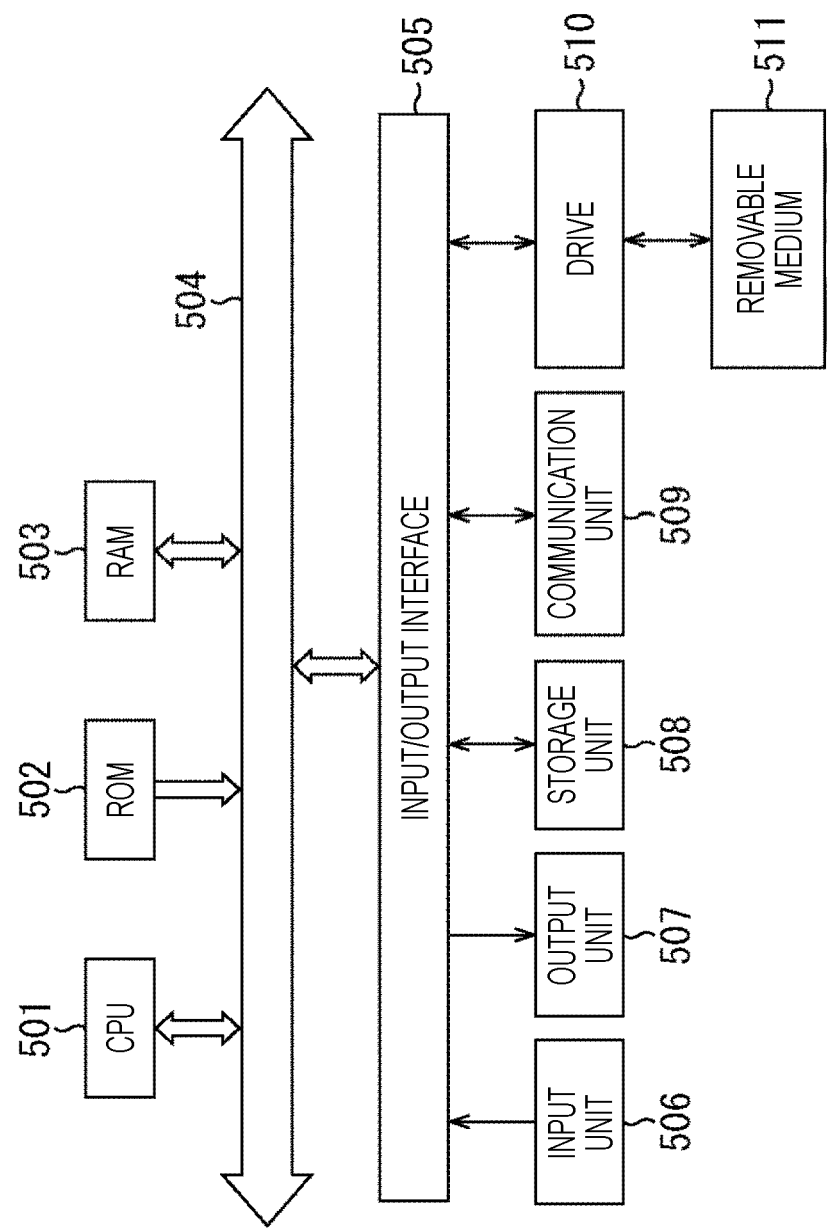
FIG. 12 is a block diagram illustrating a configuration example of a computer.

FIG. 12 is a block diagram illustrating a configuration example of hardware of a computer that executes the above-described series of processing by a program.

A central processing unit (CPU) 501, a read only memory (ROM) 502, and a random access memory (RAM) 503 are mutually connected by a bus 504 in the computer.

Further, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes a network interface and the like. The drive 510 drives a removable medium 511 such as a magnetic disk, an optical disk, a magneto-optical disk, or a semiconductor memory.

In the computer configured as described above, the CPU 501, for example, loads a program stored in the storage unit 508 into the RAM 503 and executes the program via the input/output interface 505 and the bus 504, whereby the above-described series of processing is performed.

The program to be executed by the computer (CPU 501) can be recorded on the removable medium 511 as a package medium and the like, for example, and provided. Further, the program can be provided via a wired or wireless transmission medium such as a local area network, the Internet, or digital broadcast.

In the computer, the removable medium 511 is attached to the drive 510, whereby the program can be installed in the storage unit 508 via the input/output interface 505. Further, the program can be received by the communication unit 509 via a wired or wireless transmission medium and installed in the storage unit 508. Other than the above method, the program can be installed in the ROM 502 or the storage unit 508 in advance.

Note that the program executed by the computer may be a program processed in chronological order according to the order described in the present specification or may be a program executed in parallel or at necessary timing such as when a call is made.

Further, in the present specification, the term "system" means a group of a plurality of configuration elements (devices, modules (parts), and the like), and whether all the configuration elements are in the same casing is irrelevant. Therefore, a plurality of devices that is housed in separate casings and connected via a network, and one device that houses a plurality of modules in one casing are both systems.

Further, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Further, the steps described in the above-described flowcharts can be executed by one device or can be executed by a plurality of devices in a shared manner.

Furthermore, when a plurality of processes is included in one step, the plurality of processes included in the one step can be executed by one device or can be shared and executed by a plurality of devices.

Further, the effects described in the present specification are merely examples and are not limited, and other effects may be exhibited.

Further, for example, the present technology can have the following configurations.

(1)

An information processing apparatus including:

an acoustic control unit configured to control an output of an output sound from a reflective speaker on the basis of a reflection position of the output sound.

(2)

The information processing apparatus according to (1), in which the acoustic control unit controls the output of the output sound on the basis of at least one of a distance from the reflective speaker to the reflection position and a distance from the reflection position to a user.

(3)

The information processing apparatus according to (1) or (2), in which the acoustic control unit controls the output of the output sound on the basis of a reflection characteristic of the reflection position.

(4)

The information processing apparatus according to (3), in which the reflective speaker outputs the output sound of an ultrasonic wave, and an outputting direction of the output sound in the reflective speaker is variable, the information processing apparatus further comprising:

a map generation unit configured to scan the output sound in a space where the reflective speaker reflects the output sound, and generate a space map including the reflection characteristic in the space on the basis of a detection result of a reflected sound.

(5)

The information processing apparatus according to (4), in which the map generation unit generates the space map including a three-dimensional shape of the space on the basis of the detection result of the reflected sound.

(6)

The information processing apparatus according to any one of (1) to (3), in which an outputting direction of the output sound in the reflective speaker is variable, and the acoustic control unit controls the reflection position according to the outputting direction of the output sound from the reflective speaker.

(7)

The information processing apparatus according to (6), in which the acoustic control unit controls the reflection position on the basis of a display position of an image to which the output sound corresponds.

(8)

The information processing apparatus according to (6) or (7), in which the acoustic control unit controls the reflection position on the basis of a reflection characteristic in a space where the reflective speaker reflects the output sound.

(9)

The information processing apparatus according to any one of (6) to (8), in which the acoustic control unit controls the reflection position on the basis of at least one of a pointing position that is a position specified by a user, and a direction of gaze of the user.

(10)

The information processing apparatus according to (9), in which, when an image to be displayed in the pointing position exists, the acoustic control unit causes the reflective speaker to output the output sound corresponding to the image toward the reflection position.

(11)

The information processing apparatus according to (10), further including:

an image control unit configured to control display of an image on the basis of the pointing position, in which, when an image to be displayed in the pointing position exists, the image control unit displays the image in the pointing position.

(12)

The information processing apparatus according to (9), in which, when an image to be displayed in the direction of gaze of the user exists, the acoustic control unit causes the reflective speaker to output the output sound corresponding to the image toward the reflection position.

(13)

The information processing apparatus according to (12), further including:

an image control unit configured to control display of an image on the basis of the direction of gaze of the user, in which, when an image to be displayed in the direction of gaze of the user exists, the image control unit displays the image in the direction of gaze of the user.

(14)

The information processing apparatus according to any one of (6) to (13), in which the acoustic control unit controls the reflection position on the basis of content of an image to which the output sound corresponds.

(15)

The information processing apparatus according to (14), in which
the acoustic control unit controls the reflection position on the basis of a motion of a moving body in the image.

(16)

The information processing apparatus according to any one of (1) to (15), in which
the acoustic control unit controls a characteristic of the output sound.

(17)

The information processing apparatus according to any one of (1) to (16), further including:
the reflective speaker.

(18)

The information processing apparatus according to (17), further including:
a projector having a variable projecting direction of an image, in which
an outputting direction of the output sound in the reflective speaker is variable.

(19)

An information processing method including:
an acoustic control step of controlling an output of an output sound from a reflective speaker on the basis of a reflection position of the output sound.

(20)

A program for causing a computer to execute processing including:
an acoustic control step of controlling an output of an output sound from a reflective speaker on the basis of a reflection position of the output sound.

REFERENCE SIGNS LIST

10 AV system
11 Drive-type projector
12 Drive-type speaker
13 Sensor unit
14 Operation unit
15, 16 Information processing apparatus
31 Projector
32 Depth sensor
33 Drive unit
41 Pan motor
42 Tilt motor
43 Motor control unit
51 Reflective speaker
52 Drive unit
61 Pan motor
62 Tilt motor
63 Motor control unit
71 Camera
72 Fisheye camera
73 Microphone
81 Pointing device
102 Pointing position detection unit
103 User detection unit
104 Map generation unit
107 Image control unit
122 Map generation unit
125 Acoustic control unit
200 AV system
201 Drive-type projector
202 Information processing apparatus
222 Pointing position detection unit
223 User detection unit
224 Map generation unit
227 Control unit
231 Image control unit
232 Acoustic control unit

The invention claimed is:

1. An information processing apparatus comprising:
an acoustic control unit configured to control an output of an output sound from a reflective speaker on the basis of a reflection position of the output sound, wherein the reflective speaker outputs the output sound of an ultrasonic wave, and an outputting direction of the output sound in the reflective speaker is variable;
a map generation unit configured to scan the output sound in a space where the reflective speaker reflects the output sound, and generate:
a first space map including the reflection characteristic in the space on the basis of a detection result of a reflected sound, and depth information indicating the distance of each position in a display space from a drive-type projector;
a second space map including depth information indicating a distance of each position in the display space from the reflective speaker, and reflection characteristic information indicating reflection characteristics of each position; and
an integrated map from the first and second space maps, and
wherein the acoustic control unit and the map generation unit are each implemented via at least one processor.

2. The information processing apparatus according to claim 1, wherein
the acoustic control unit controls the output of the output sound on the basis of at least one of a distance from the reflective speaker to the reflection position and a distance from the reflection position to a user.

3. The information processing apparatus according to claim 1, wherein
the map generation unit generates the space map including a three-dimensional shape of the space on the basis of the detection result of the reflected sound.

4. The information processing apparatus according to claim 1, wherein
an outputting direction of the output sound in the reflective speaker is variable, and
the acoustic control unit controls the reflection position according to the outputting direction of the output sound from the reflective speaker.

5. The information processing apparatus according to claim 4, wherein
the acoustic control unit controls the reflection position on the basis of a display position of an image to which the output sound corresponds.

6. The information processing apparatus according to claim 4, wherein
the acoustic control unit controls the reflection position on the basis of a reflection characteristic in a space where the reflective speaker reflects the output sound.

7. The information processing apparatus according to claim 4, wherein
the acoustic control unit controls the reflection position on the basis of at least one of a pointing position that is a position specified by a user, and a direction of gaze of the user.

8. The information processing apparatus according to claim 7, wherein,
when an image to be displayed in the pointing position exists, the acoustic control unit causes the reflective speaker to output the output sound corresponding to the image toward the reflection position.

9. The information processing apparatus according to claim 8, further comprising:
an image control unit configured to control display of an image on the basis of the pointing position, wherein,
when an image to be displayed in the pointing position exists, the image control unit displays the image in the pointing position, and
wherein the image control unit is implemented via at least one processor.

10. The information processing apparatus according to claim 7, wherein,
when an image to be displayed in the direction of gaze of the user exists, the acoustic control unit causes the reflective speaker to output the output sound corresponding to the image toward the reflection position.

11. The information processing apparatus according to claim 10, further comprising:
an image control unit configured to control display of an image on the basis of the direction of gaze of the user, wherein,
when an image to be displayed in the direction of gaze of the user exists, the image control unit displays the image in the direction of gaze of the user, and
wherein the image control unit is implemented via at least one processor.

12. The information processing apparatus according to claim 4, wherein
the acoustic control unit controls the reflection position on the basis of content of an image to which the output sound corresponds.

13. The information processing apparatus according to claim 12, wherein
the acoustic control unit controls the reflection position on the basis of a motion of a moving body in the image.

14. The information processing apparatus according to claim 1, wherein
the acoustic control unit controls a characteristic of the output sound.

15. The information processing apparatus according to claim 1, further comprising:
the reflective speaker.

16. The information processing apparatus according to claim 15, further comprising:
a projector having a variable projecting direction of an image, wherein
an outputting direction of the output sound in the reflective speaker is variable.

17. An information processing method comprising:
controlling an output of an output sound from a reflective speaker on the basis of a reflection position of the output sound, wherein the reflective speaker outputs the output sound of an ultrasonic wave, and an outputting direction of the output sound in the reflective speaker is variable;
scanning the output sound in a space where the reflective speaker reflects the output sound;
generating a first space map including the reflection characteristic in the space on the basis of a detection result of a reflected sound, and depth information indicating the distance of each position in a display space from a drive-type projector;
generating a second space map including depth information indicating a distance of each position in the display space from the reflective speaker, and reflection characteristic information indicating reflection characteristics of each position; and
generating an integrated map from the first and second space maps.

18. A non-transitory computer-readable medium having embodied thereon a program, which when executed by a computer causes the computer to execute a method, the method comprising:
controlling an output of an output sound from a reflective speaker on the basis of a reflection position of the output sound, wherein the reflective speaker outputs the output sound of an ultrasonic wave, and an outputting direction of the output sound in the reflective speaker is variable;
scanning the output sound in a space where the reflective speaker reflects the output sound;
generating a first space map including the reflection characteristic in the space on the basis of a detection result of a reflected sound, and depth information indicating the distance of each position in a display space from a drive-type projector;
generating a second space map including depth information indicating a distance of each position in the display space from the reflective speaker, and reflection characteristic information indicating reflection characteristics of each position; and
generating an integrated map from the first and second space maps.

* * * * *